United States Patent
Naito

(10) Patent No.: US 7,949,119 B2
(45) Date of Patent: May 24, 2011

(54) TELEPHONE EXCHANGE SYSTEM

(75) Inventor: Yoichi Naito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 916 days.

(21) Appl. No.: 11/902,138

(22) Filed: Sep. 19, 2007

(65) Prior Publication Data

US 2008/0080695 A1    Apr. 3, 2008

(30) Foreign Application Priority Data

Sep. 29, 2006  (JP) ................. 2006-268263

(51) Int. Cl.
*H04M 7/00*    (2006.01)
(52) U.S. Cl. .................. 379/221.03; 379/225
(58) Field of Classification Search ............. 379/221.03, 379/219, 221.01, 225
See application file for complete search history.

(56) References Cited

U.S. PATENT DOCUMENTS

| | | | | |
|---|---|---|---|---|
| 4,922,521 A | * | 5/1990 | Krikke et al. ............... | 379/93.02 |
| 5,065,425 A | * | 11/1991 | Lecomte et al. ........... | 379/93.05 |
| 5,805,692 A | | 9/1998 | Oerlemans et al. | |
| 6,950,426 B2 | * | 9/2005 | Abel et al. .................... | 370/352 |
| 2008/0080695 A1 | * | 4/2008 | Naito ............................ | 379/225 |

FOREIGN PATENT DOCUMENTS

| | | |
|---|---|---|
| JP | 57-155867 | 9/1982 |
| JP | 09-512690 | 12/1997 |
| JP | 9-512690 A | 12/1997 |
| JP | 10-260922 A | 9/1998 |
| JP | 2002-232566 | 8/2002 |
| JP | 2002-323566 | 8/2002 |
| JP | 2002-542742 A | 12/2002 |
| JP | 2006-019985 | 1/2006 |

OTHER PUBLICATIONS

Japanese Office Action dated Feb. 10, 2009 for Appln. No. 2006-268263.
Japanese Office Action dated May 19, 2009 for Appln. No. 2006-268263.

* cited by examiner

*Primary Examiner* — Creighton Smith
(74) *Attorney, Agent, or Firm* — Pillsbury Winthrop Shaw Pittman, LLP

(57) ABSTRACT

According to one embodiment, a telephone exchange system includes a first telephone exchange apparatus, a second telephone exchange apparatus which is connected to the first telephone exchange apparatus via a first communication network, a computer apparatus which establishes a communication link with the first telephone exchange apparatus via the first communication network and executes a part of function regarding exchange processing by the first and the second telephone exchange apparatuses, a second communication network which connects among a plurality of telephone terminals and the first and the second telephone exchange apparatuses, a communicator which connects a telephone terminal of a request source to the first telephone exchange apparatus via the second communication network, and a controller which executes the service based on a communication result by the communicator.

5 Claims, 9 Drawing Sheets

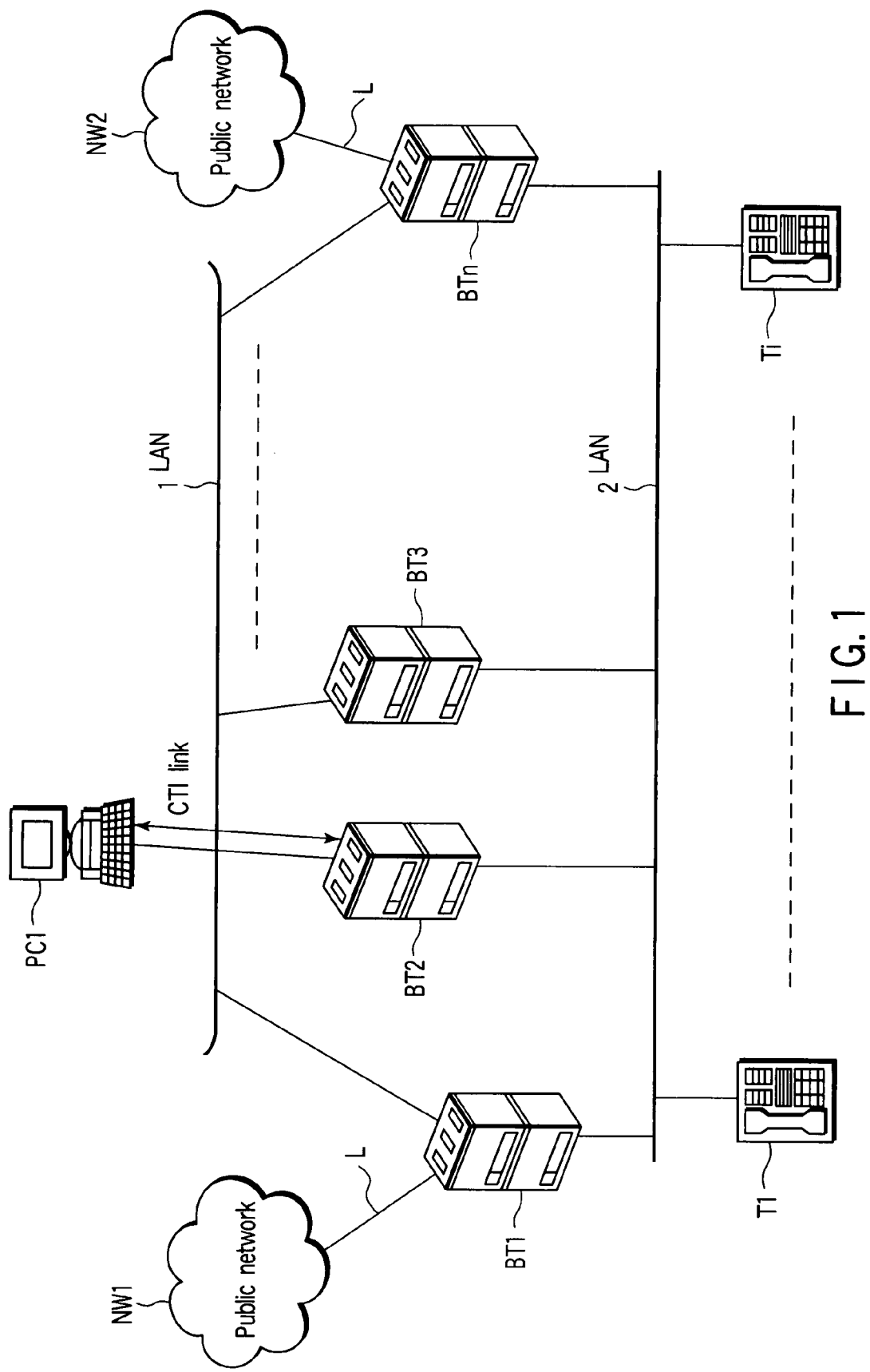
F I G. 1

| DN | Destination telephone exchange ID |
|---|---|
| 200 | 1 |
| 201 | 1 |
| 300 | 2 |
| 301 | 2 |

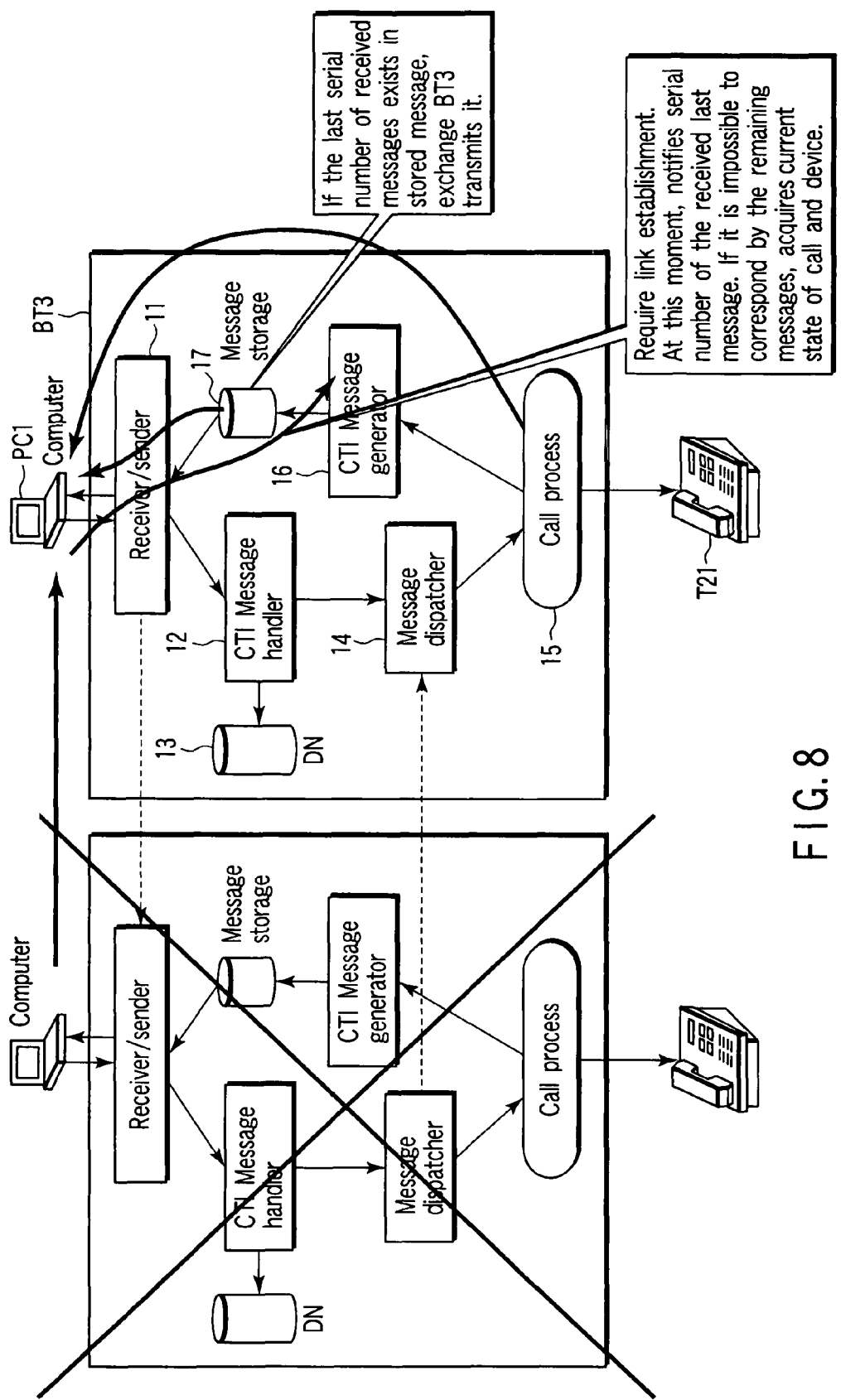
F I G. 8

| Group name | Member | Computer for CTI |
|---|---|---|
| G1 | BT1,BT2,BT3 | PC1 |
| G2 | BT4······BTn | PC2 |

TELEPHONE EXCHANGE SYSTEM

CROSS-REFERENCE TO RELATED APPLICATIONS

This application is based upon and claims the benefit of priority from Japanese Patent Application No. 2006-268263, filed Sep. 29, 2006, the entire contents of which are incorporated herein by reference.

BACKGROUND

1. Field

One embodiment of the present invention relates to a telephone exchange system which employs computer telephony integration (CTI).

2. Description of the Related Art

An exchange network system, for example in an enterprise having a plurality of branch offices and business offices, installs a telephone exchange apparatus such as a private branch exchange (PBX) and a key telephone apparatus in each branch office and a business office, and connects these telephone exchange apparatuses with one another via exclusive lines. This kind of system may perform an inter-extension communication among different telephone exchange apparatuses and an office line transmission/reception via different telephone exchange apparatuses as well as may perform an inter-extension communication and an office line transmission/reception through a public network etc. for each telephone exchange apparatus.

By the way, also in the foregoing system, employment of the CTI has been examined. The CTI connects a personal computer to the telephone exchange apparatus, makes the personal computer perform a part of exchange processing of the telephone exchange apparatus, and store, process, etc., a voice and data, then may achieve a system with a high function without having to enhance the processing function of the telephone exchange apparatus.

However, the system given above needs to install a computer for CTI for every telephone exchange apparatus, it increases in cost of the whole of the system. Conventionally, a method in which the computer for the CTI is connected to one of the plurality of telephone exchanges to share the computer with a large number of telephone exchange apparatuses has been proposed (e.g., Jpn. Pat. Appln. KOKAI Publication 9-512690).

However, when a fault occurs on a telephone exchange apparatus to be a request side of an additional service by the computer for the CTI, the corresponding telephone terminal becomes disabled to utilize all additional services until the fault is recovered.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary schematic configuration view depicting the first embodiment of a telephone exchange system regarding the invention;

FIG. 8 is an exemplary view depicting a sequence when a CTI link is established between the IP telephone exchange apparatus other than the representative and a computer for CTI in the second embodiment of the invention;

DETAILED DESCRIPTION

Various embodiments according to the invention will be described hereinafter with reference to the accompanying drawings, In general, according to one embodiment of the invention, a telephone exchange system, comprising: a first telephone exchange apparatus; a second telephone exchange apparatus which is connected to the first telephone exchange apparatus via a first communication network; a computer apparatus which establishes a communication link with the first telephone exchange apparatus via the first communication network and executes a part of function regarding exchange processing by the first and the second telephone exchange apparatuses; a second communication network which connects among a plurality of telephone terminals and the first and the second telephone exchange apparatuses; a communicator which connects a telephone terminal of a request source to the first telephone exchange apparatus via the second communication network, to communicate a control message necessary for executing a service using the computer apparatus via the first communication network between the first telephone exchange apparatus and the computer apparatus, when a request for the service using the computer apparatus is generated from the telephone terminal; and a controller which executes the service based on a communication result by the communicator.

First Embodiment

FIG. 1 is a schematic configuration view illustrating the first embodiment of a telephone exchange system concerning the invention.

The system has a local area network (LAN) 1. A plurality of IP telephone exchange apparatuses BT1-BTn (n is natural number) are connected to the LAN 1. A computer PC1 for CTI is connected to the LAN 1.

A plurality of telephone terminals T1-Ti are connected to the plurality of IP telephone exchange apparatuses BT1-BTn via a LAN 2. Further, the IP telephone exchange apparatuses BT1-BTn are connected to public networks NW1 and NW2 via an office line L.

In the first embodiment, the system selects a representative among the plurality of IP telephone exchange apparatuses BT1-BTn, and the computer PC1 first connects to the IP telephone exchange apparatus BT2 so as to establish a CTI link via the LAN 1 in accordance with a list. And then if the computer PC1 cannot connects to the IP telephone exchange apparatus BT2 in a predetermined time of reconnection, the computer PC1 connects to the IP telephone exchange apparatus BTn as next candidate. the IP telephone exchange apparatus BT2 sets CTI links individually to the IP telephone exchange apparatus BT1 and IP telephone exchange apparatuses BT3-BTn to transmit the CTI information. The information collected to the IP telephone exchange apparatus BT2 is exchanged for the information of the computer PC1 for the CTI together.

Figure 2:
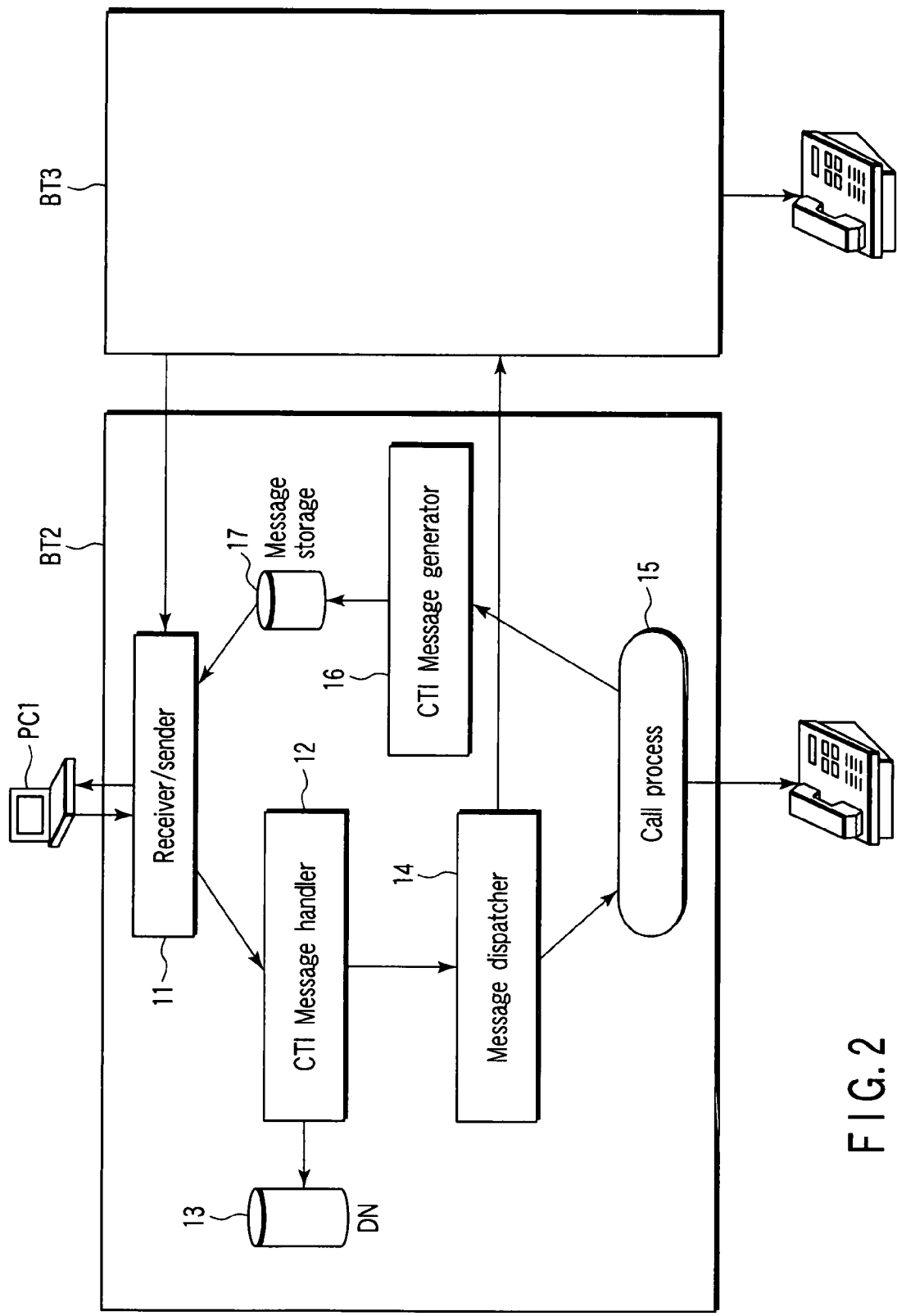
FIG. 2 is an exemplary block diagram depicting a function configuration of an Internet protocol (IP) telephone exchange apparatus depicted in FIG. 1.

FIG. 2 is a block diagram illustrating function configurations of the IP telephone exchange apparatuses BT1-BTn. Here, the IP telephone exchange apparatus BT2 is explained in behalf of other IP telephone exchange apparatuses.

A receiver/sender 11 maintaining a CTI link with the computer PC1 receives messages from the computer PC1 to distribute the messages to appropriate functions. If a transmission request is issued inside, the receiver/sender 11 transmits the relevant message to the CTI link.

The received CTI message is sent from the receiver/sender 11 to a CTI message handler 12 and translated there.

Figures 3, 5:
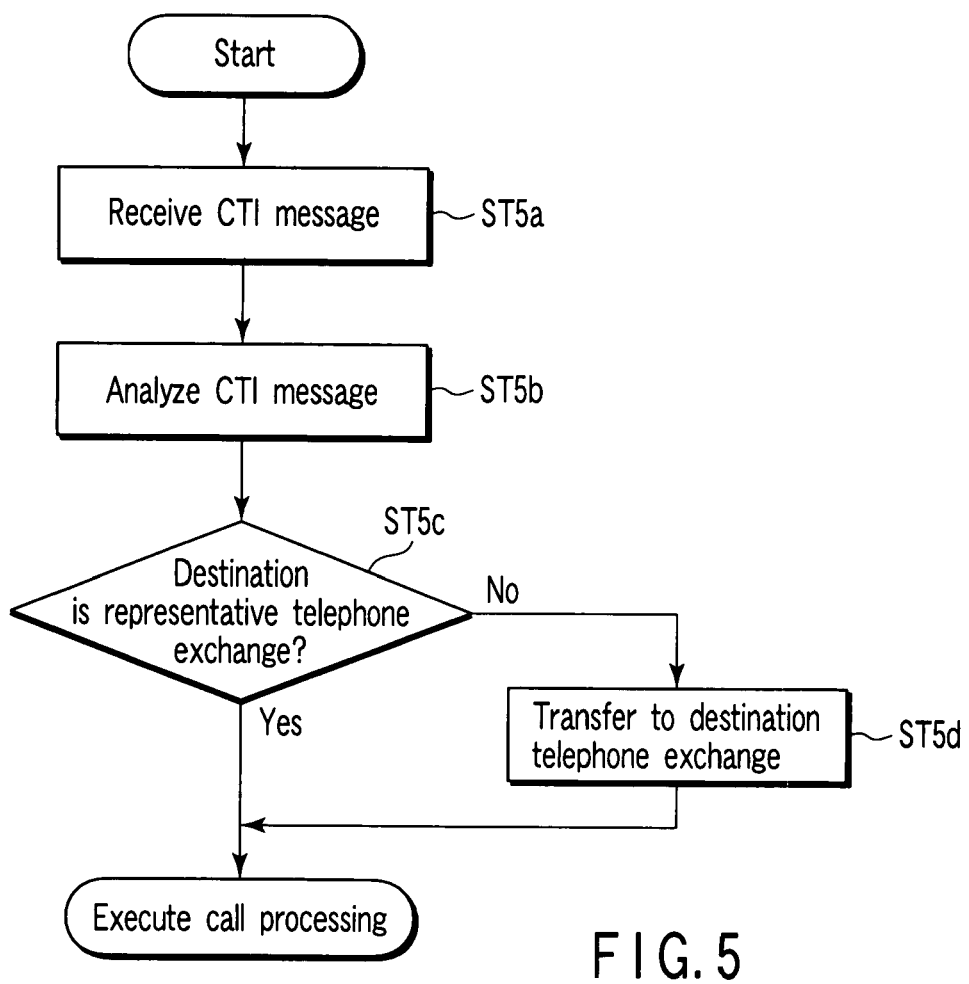
FIG. 3 is an exemplary view depicting an example of a storage content of a storage unit depicted in FIG. 2.
FIG. 5 is an exemplary flowchart depicting a control processing procedure of an IP telephone exchange apparatus in receiving a CTI message in the first embodiment of the invention.

At this moment, the message handler 12 compares the information stored in the storage unit to call numbers and device IDs included in the CTI message. As shown in FIG. 3, a table showing correspondence relations among extension numbers (DNs) of the telephone terminal T1-Ti and destination telephone exchange IDs specifying the IP telephone exchange apparatuses BT1-BTn, respectively, is stored in the storage unit 13.

A message dispatcher 14 determines, from the comparison result by the message handler 12, whether the CTI message should be processed by the representative IP telephone exchange apparatus BT2, or should be transferred to other IP telephone exchange apparatuses BT1, and BT3-BTn.

Here, if the CTI message should be processed in the representative exchange apparatus BT2, the exchange apparatus BT2 transfers the message to a call process 15 to control call processing (regardless of transfer of CTI message as it is or as translated another message) to be appropriately processed, and requires to generate and notify a response message for the generated CTI event and CTI message for a message generator 16.

The message generator 16 generates the CTI message in accordance with specifications and requires a transmission of the receiver/sender 11 to the computer PC1 through a message storage 17.

The message storage 17 can store the CTI message to which the defined number of pieces of transmission processing applied. Because a size of a buffer is limited, CTI messages which have become unnecessary are determined and deleted by a cyclic method or other methods.

On the contrary, if the CTI message should not be processed in the representative exchange apparatus BT2, the message dispatcher 14 determines an appropriate transfer destination IP telephone exchange apparatus from the CTI message, and transmits the CTI message to the transfer destination IP telephone exchange apparatus. Other IP telephone exchange apparatus BT3 which has received the CTI message appropriately applies processing to the message, and requires to message generator 16 of the representative exchange apparatus BT2 so as to generate a CTI message which has generated based on the processing result and should be transmitted. (Another IP telephone exchange apparatus BT3 generates a CTI message to be transmitted therefrom, and directly sends to the receiver/sender 11 of the representative IP telephone exchange apparatus BT2 sometimes).

Next, operations of the configuration described above will be described.

Figure 4:
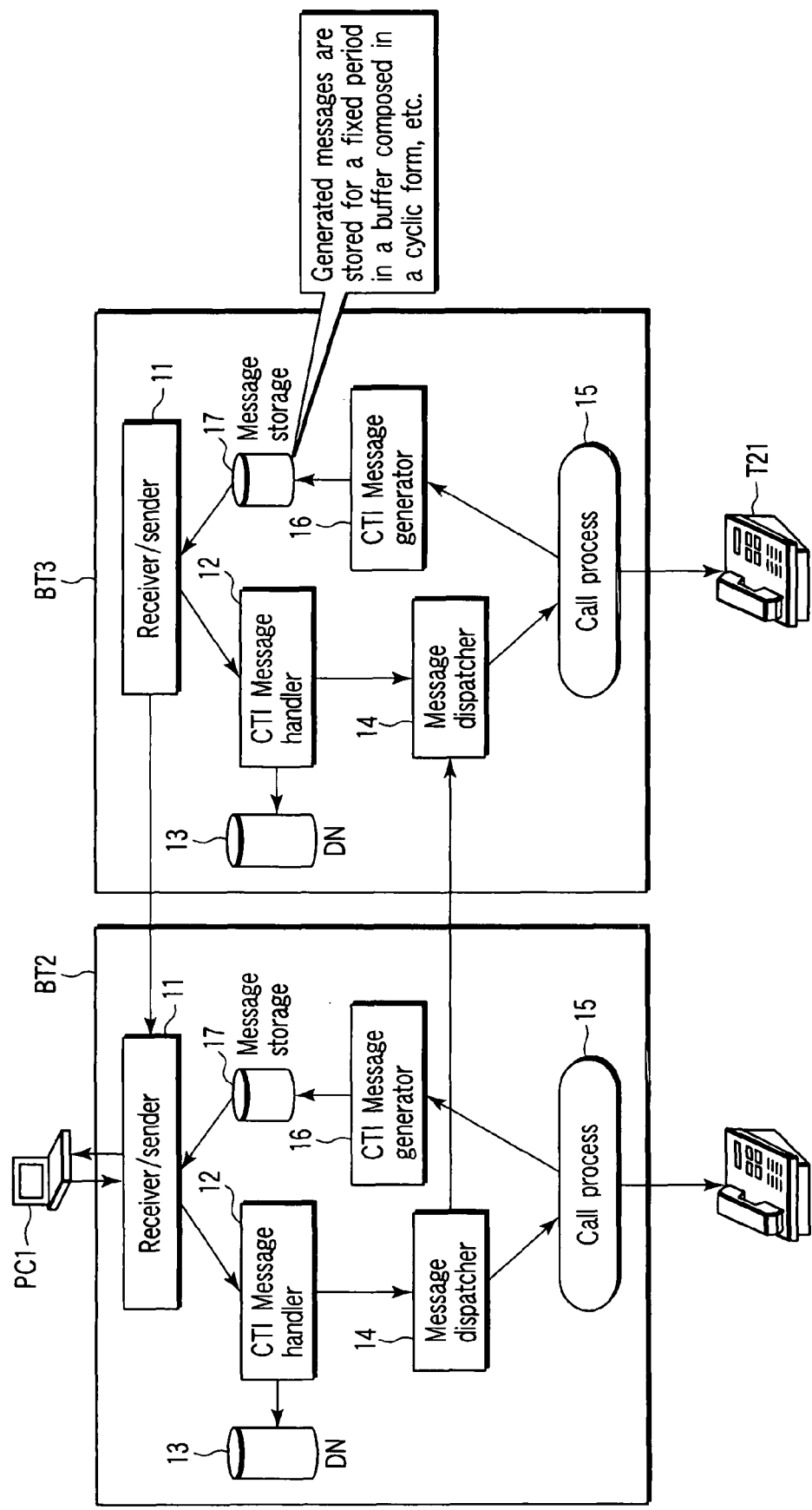
FIG. 4 is an exemplary view depicting a sequence until a representative IP telephone exchange apparatus changes its place with another IP telephone exchange to re-establish a CTI link when a fault occurs on IP telephone exchange apparatus other than the representative.

FIG. 4 shows a sequence after the representative exchange BT2 has changed its place with the exchange apparatus BT3 until the CTI link is re-established when a fault occurs on the exchange apparatus BT3.

Here, the exchange apparatus BT2, as the representative, establishes the CTI link with the computer PC1. Therefore, the operation event generated from the telephone terminal T21 belonging to the exchange apparatus BT3 is transferred to the IP telephone exchange apparatus BT2 via the LAN 2, and arrives at the computer PC1.

Figure 6:
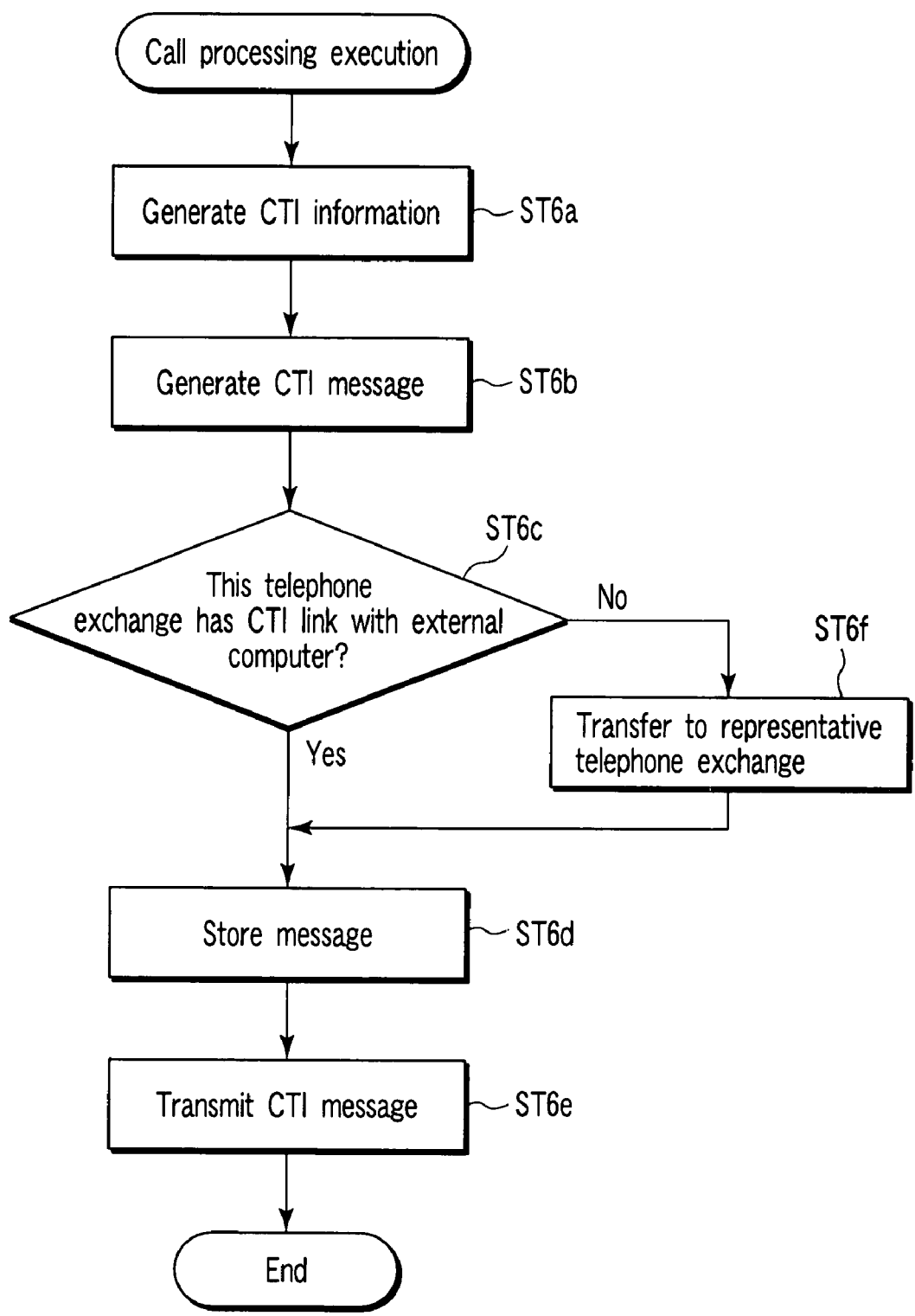
FIG. 6 is an exemplary flowchart depicting a control processing procedure of the IP telephone exchange apparatus in transmitting the CTI message in the first embodiment of the invention.

At this time, the exchange apparatus BT2 executes the control processing procedures shown in FIG. 5 and FIG. 6.

When the exchange apparatus BT2 receives the CTI message (block ST5a), the exchange apparatus BT2 analyzes the received message (block ST5b). The exchange apparatus BT2 determines the destination of the CTI message from the call number and device ID included in the CTI message (block ST5c).

Here, if the destination is the representative exchange apparatus BT2 (message addressed to IP telephone exchange apparatus itself which has received CTI message), the exchange apparatus BT2 requires processing to the call processing function owned itself.

In contrast, if the destination is designated for another IP telephone exchange apparatus (No), the exchange apparatus BT2 decides the transfer destination, and transmits the CTI message (or converted message) to the transfer designation IP telephone exchange apparatus (block ST5d). The side of the transfer destination requires the call processing function to perform processing for the received message.

After this, if the resulting operation of the call processing function poses the necessity of a transmission of the CTI message, the exchange apparatus BT2 generates the CTI information and the CTI message be transmitted (block ST6a and block ST6b).

When the exchange apparatus BT2 itself has a CTI link to send the CTI information to the computer PC1, the exchange apparatus BT2 shifts from the block ST6c to a block ST6d, and there, it stores the CTI message to a message storage 17, then, transmits the CTI message to the computer PC1 (block ST6e).

In contrast, if an IP telephone exchange apparatus, like the exchange apparatus BT1, does not have the CTI link to send the CTI information to the computer PC1, the exchange apparatus BT1 transfers the CTI information to the exchange apparatus BT2 (block ST6f), and creates the CTI message by the exchange apparatus BT2 to transmit it to the computer PC1.

As mentioned above, in the first embodiment, since the telephone exchange system connects the computer PC1 for the CTI to the IP telephone exchange apparatus BT2 to be the representative so as to connect among the representative exchange apparatus BT2, other exchange apparatuses BT1 and BT3-BTn, and the plurality of telephone terminals T1-Ti through the LAN 2, even if a fault occurs on the exchange apparatus BT3, the system may connects the telephone terminal T21 belonging to the exchange BT3 to the representative exchange apparatus BT2 via the LAN 2, thereby the system may successively utilize the additional service to be executed by the computer PC1.

In the first embodiment, when it is determined that the telephone terminal T21 of the request source belongs to the exchange apparatus BT3 other than the representative, the system transfers the CTI message from the representative exchange apparatus BT2 to the exchange apparatus BT3 to process it by utilizing the call number (DN) and the device ID (telephone exchange ID) which have been added to the CTI message.

Accordingly, the system may execute the processing of the service provided from the computer PC1 by sharing it with another exchange apparatus BT3 without depending on the representative exchange apparatus BT2; thereby the exchanges BT2 and BT3 can efficiently perform the processing of the service to be provided from the computer PC1 in cooperation with each other.

Second Embodiment

The second embodiment of the invention shows a correspondence means in the case of an occurrence of a fault of the IP telephone exchange BT2 to be the representative.

Figure 7:
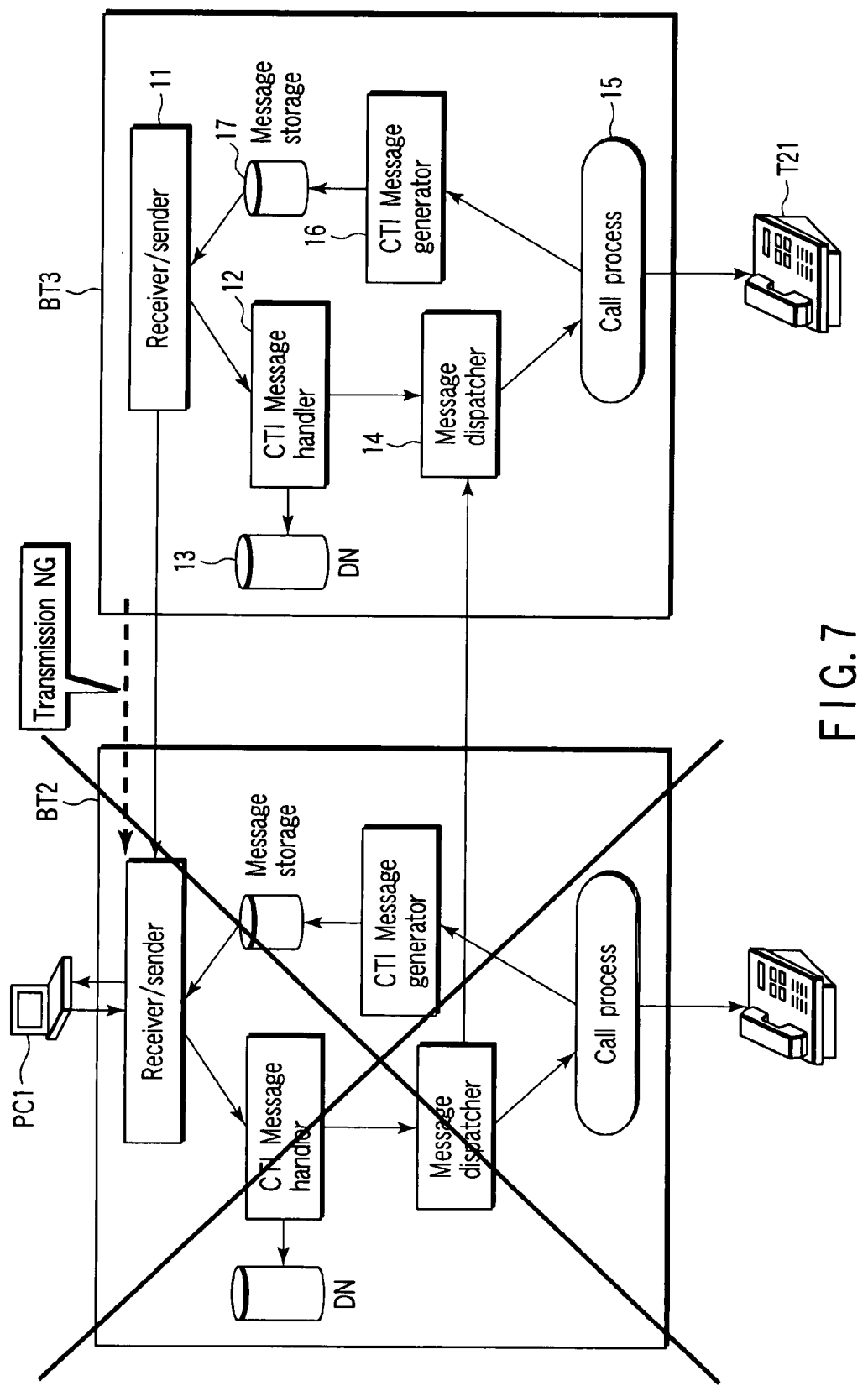
FIG. 7 is an exemplary view depicting a sequence when the IP telephone exchange apparatus other than the representative detects a fault of the representative IP telephone exchange apparatus as the second embodiment of the invention.

FIG. 7 illustrates a sequence when another IP telephone exchange apparatus BT3 detects the fault of the representative exchange apparatus BT2, as the second embodiment of the invention.

In other words, when the exchange apparatus BT3 intends to transmit an operation event from the exchange apparatus BT3 to the exchange apparatus BT2, the exchange apparatus BT3 detects the fault of the exchange apparatus BT2 in accordance with the failure of the transmission.

As shown in FIG. 8, the computer PC1 then also detects the breakdown of the exchange apparatus BT2, and connects to the exchange apparatus BT3 so as to establish a CTI link via the LAN 1 in accordance with a defined rule. In the case of normal termination of the connection, the computer PC1 sends the last serial number of the massages (message number to be increased by one for every message) which has been received by the computer PC1 to the exchange apparatus BT3.

The exchange apparatus BT3 takes out the messages after the last serial number form the message storage 17 to re-send it to the computer PC1 (the exchange apparatus BT3 voluntarily sends the messages without transferring the serial numbers sometimes).

When the messages stored in the message storage 17 are not all of messages to be required from the computer PC1, namely when a part of messages has been deleted according to the convenience of the storage capacity, the computer PC1 requires for state acquisition to the exchange apparatus BT3 so as to match the states of a call and a device with each other.

Figure 9:
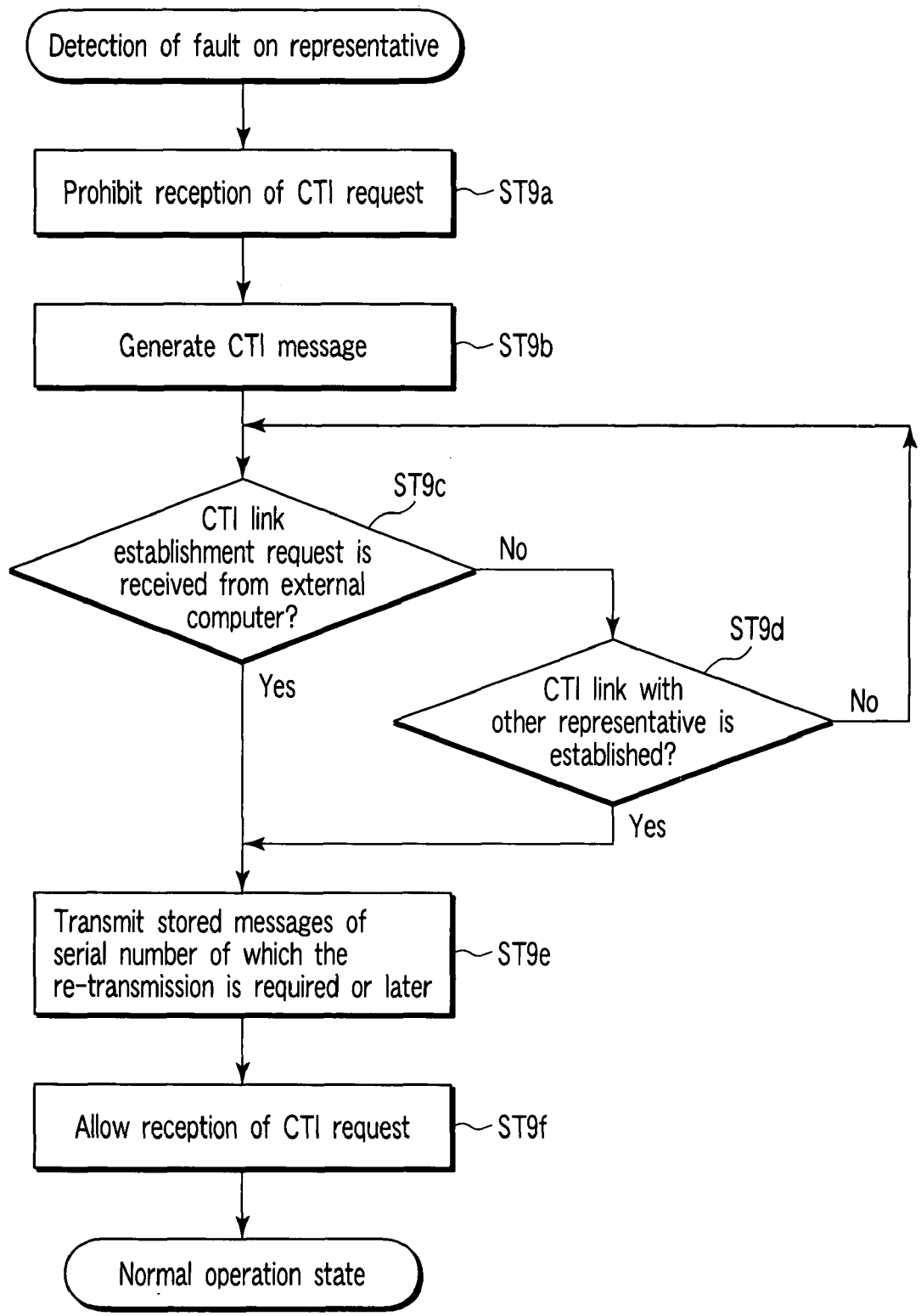
FIG. 9 is an exemplary flowchart depicting processing operations of the IP telephone exchange apparatus other than the representative when a fault of the IP telephone exchange apparatus to be the representative is detected in the second embodiment of the invention.

FIG. 9 is a flowchart illustrating the processing operations of the exchange apparatus BT3 when the fault of the exchange apparatus BT2 to be the representative.

When detecting the system down of the representative exchange apparatus BT2, the exchange apparatus BT3 resets the destination of the CTI message information, and brings itself into a mode not to receive a new piece of CTI message information (block ST9a and block ST9b).

After this, the exchange apparatus BT3 continuously waits for until it becomes the state in which it directly receives the establishment of the CTI link from the computer PC1, or it receives the link establishment when another exchange apparatus BT1 becomes the representative (block ST9c and block ST9d).

Here, when the CTI link is established, the exchange apparatus BT3 shifts from the block ST9c to a block ST9e, and there, looks for the serial number to which the received retransmission information is required from the stored messages, and if the message of the corresponding serial number exists, the exchange apparatus BT3 re-transmits the message of the serial number or later, and if the message of the corresponding serial number does not exist, the exchange apparatus BT3 re-transmits all messages from the oldest one in turn.

After the completion of re-transmissions of the messages, the exchange apparatus BT3 releases the mode in which the new CTI message is not receivable (block ST9f), and returns in a normal operation state.

The exchange apparatus BT3 which has become the representative notifies the fact that the former representative exchange apparatus BT2 which has gone to the breakdown is not in the breakdown state to the computer PC1.

As mentioned above, in the second embodiment, when the fault occurs on the IP telephone exchange apparatus BT2 to be the representative, since the CTI link becomes to be established between the normal IP telephone exchange apparatus BT3 and the computer PC1 for the CTI, the telephone exchange system, for example, becomes able to successively require the additional service to the computer PC1 by means of the telephone terminal T21, also at this view point, the system may efficiently execute the desired processing in the system without any delay.

Third Embodiment

Figures 10, 11:
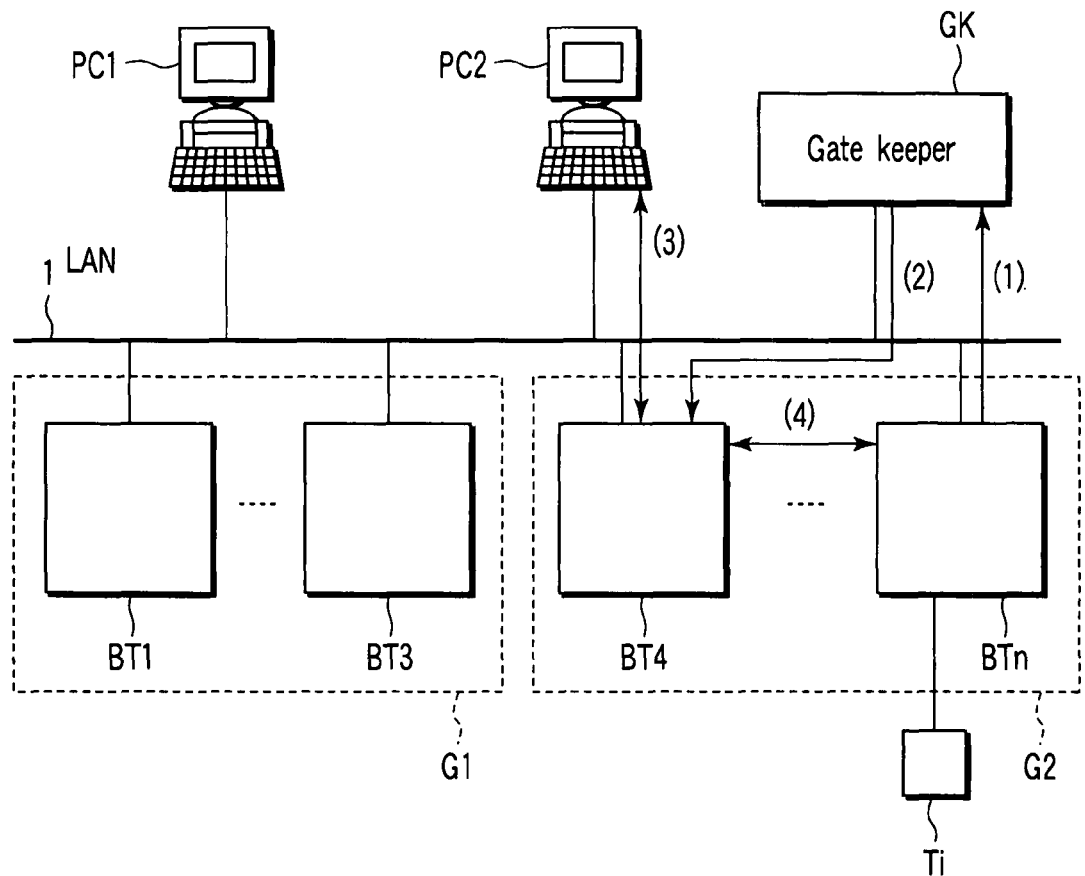
FIG. 10 is an exemplary block diagram for explaining CTI link establishment operations for each group in a telephone exchange system regarding the third embodiment of the invention.
FIG. 11 is an exemplary view depicting an example of a storage content of a group management table to be stored in a gate keeper depicted in FIG. 10.

FIG. 10 is a block diagram for explaining CTI link establishment operations for each group in a telephone exchange system concerning the third embodiment of the invention.

Furthermore, a computer PC2 for CTI and a gate keeper GK are connected to the LAN 1. The gate keeper GK has a group management table and also has a group assigning control function to each IP telephone exchange apparatus BT1-BTn based on the management table.

As shown in FIG. 11, correspondence relations among a plurality of groups G1 and G2 composed by dividing the exchange apparatuses BT1-BTn, a plurality of IP telephone exchange apparatuses belonging to the group G1 and G2, and the computers PC1 and PC2 are stored in the management table.

Next to this, operations of the system constituted as given above will be described.

As depicted in FIG. 10, it is presumed that the computers PC1 and PC2 perform operations to utilize additional services provided from the computers PC1 and PC2 in a telephone terminal Ti belonging to the exchange BTn. The telephone terminal Ti then transmits an operation event to the gate keeper GK through the exchange apparatus BTn.

The gate keeper GK retrieves a group to which the exchange apparatus BTn should belong from the management table, and determines a representative IP telephone exchange apparatus BT4 and the computer PC2 belonging to the retrieved group. The gate keeper GK transmits a control signal to the exchange apparatus BT4 based on the determination result to establish a CTI link to and from the computer PC2.

After this, the user of the telephone terminal Ti may utilize the service provided from the computer PC2.

As mentioned above, in the third embodiment, the system installs the group management table in which the exchange apparatuses BT1-BTn, the computers PC1 and PC2 for the CTI, and the groups G1 and G2 are associated with one another in advance in the gate keeper GK, and establishes the CTI link with the computers PC1 and PC2 by group.

Accordingly, for instance, in the case of sharing of one system with a plurality of companies and individuals, the system may limit the representative IP telephone exchange apparatuses BT1, BT4, and the computers PC1, PC2 for the CTI to be used in each company or individual, thereby the system may make charge processing for each company or individual clear.

Other Embodiment

The invention is not limited to each of the foregoing embodiments. For example, while the first embodiment has been described about the example in which the IP telephone exchange apparatus BT3 other than the representative generates the CTI information in the CTI message, the IP telephone exchange apparatus BT2 to be the representative may generate the CTI message.

Although the third embodiment has been described about the example in which the group management table is disposed in the gate keeper GK, if the gate keeper is not disposed, disposing the management table in at least one of the plurality of IP telephone exchange apparatuses BT1-BTn is a possible approach.

Having described the third embodiment about the example to limit the computers PC1 and PC2 for the CTI to be used for each group which is formed by dividedly constituting the IP telephone exchange apparatuses BT1-BTn, the computers PC1 and PC2 may be specified for each service to be utilized.

Other than this, various modification of a configuration and a kind of a system, a configuration and a kind of an IP telephone exchange, a kind of a telephone exchange apparatus, a kind of a computer for CTI, each procedure and its content of CTI link establishment control, fault monitoring control, and fault corresponding control, etc., may be embodied without departing from the concept of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone exchange system, comprising:
   a first telephone exchange apparatus;
   a second telephone exchange apparatus which is connected to the first telephone exchange apparatus via a first communication network;
   a computer apparatus which establishes a communication link with the first telephone exchange apparatus via the first communication network and executes a part of function regarding exchange processing by the first and the second telephone exchange apparatuses;
   a second communication network which connects among a plurality of telephone terminals and the first and the second telephone exchange apparatuses;
   a communicator which connects a telephone terminal of a request source to the first telephone exchange apparatus via the second communication network, to communicate a control message necessary for executing a service using the computer apparatus via the first communication network between the first telephone exchange apparatus and the computer apparatus, when a request for the service using the computer apparatus is generated from the telephone terminal; and
   a controller which executes the service based on a communication result by the communicator.

2. The system according to claim 1, wherein the controller determines whether the telephone terminal of the request source belongs to the first telephone exchange apparatus or to the second telephone exchange apparatus based on the control message, and transfers the control message from the first telephone exchange apparatus to the second telephone exchange apparatus to process the control message, when the telephone terminal belongs to the second telephone exchange apparatus.

3. The system according to claim 1, further comprising:
   a fault corresponding unit to establish a communication link between the second telephone exchange apparatus and the computer apparatus, when a fault occurs on the first telephone exchange apparatus.

4. The system according to claim 1, further comprising
   a plurality of telephone exchange apparatuses among which the first and the second telephone exchange apparatuses are included:
   a plurality of computer apparatuses among which the computer apparatus is included: and
   a memory which stores a group table in which computer apparatuses to establish communication links are associated for each group, respectively, when the first and the second telephone exchange apparatuses are divided into a plurality of groups, wherein
   the communicator refers to the group table when the request for the service using the computer apparatus is generated from the telephone terminal, connects the telephone terminal to the first telephone exchange apparatus in the group to which the telephone terminal of the request source belongs based on the reference result, and communicates the control message via the communication link established on the first communication network between the first telephone exchange apparatus and the computer apparatus.

5. The system according to claim 1, further comprising a plurality of computer apparatuses among which the computer apparatus is included, wherein
   the communicator selects at least one computer apparatus among the plurality of computer apparatuses based on a content of the request for the service, when the request for the service is generated from the telephone terminal.

* * * * *